US010633498B2

(12) United States Patent
Ishiguro et al.

(10) Patent No.: US 10,633,498 B2
(45) Date of Patent: Apr. 28, 2020

(54) METHOD FOR MANUFACTURING MICROPOROUS FILM AND MICROPOROUS FILM

(71) Applicant: THE JAPAN STEEL WORKS, LTD., Shinagawa-ku, Tokyo (JP)

(72) Inventors: Ryou Ishiguro, Hiroshima (JP); Satoru Nakamura, Hiroshima (JP); Mariko Yoshioka, Kyoto (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 19 days.

(21) Appl. No.: 15/553,815

(22) PCT Filed: Feb. 25, 2016

(86) PCT No.: PCT/JP2016/055644

§ 371 (c)(1),
(2) Date: Aug. 25, 2017

(87) PCT Pub. No.: WO2016/136881

PCT Pub. Date: Sep. 1, 2016

(65) Prior Publication Data

US 2018/0037704 A1 Feb. 8, 2018

(30) Foreign Application Priority Data

Feb. 26, 2015 (JP) ................................ 2015-036911

(51) Int. Cl.

| | |
|---|---|
| ***B29C 55/00*** | (2006.01) |
| ***B29C 55/14*** | (2006.01) |
| ***B29C 55/18*** | (2006.01) |
| ***C08J 5/18*** | (2006.01) |
| ***B29C 48/00*** | (2019.01) |
| ***C08K 5/20*** | (2006.01) |
| ***H01M 2/16*** | (2006.01) |
| ***C08L 23/12*** | (2006.01) |
| ***C08J 9/00*** | (2006.01) |
| ***C08L 1/02*** | (2006.01) |
| ***B29C 55/12*** | (2006.01) |
| *B29C 48/08* | (2019.01) |
| *B29K 23/00* | (2006.01) |
| *B29K 105/04* | (2006.01) |
| *B29K 105/16* | (2006.01) |
| *B29K 401/00* | (2006.01) |

(52) U.S. Cl.

CPC ............. *C08J 5/18* (2013.01); *B29C 48/0018* (2019.02); *B29C 55/12* (2013.01); *C08J 9/00* (2013.01); *C08K 5/20* (2013.01); *C08L 1/02* (2013.01); *C08L 23/12* (2013.01); *H01M 2/16* (2013.01); *B29C 48/08* (2019.02); *B29K 2023/12* (2013.01); *B29K 2105/041* (2013.01); *B29K 2105/162* (2013.01); *B29K 2401/00* (2013.01); *C08J 2323/12* (2013.01); *C08J 2401/02* (2013.01)

(58) Field of Classification Search

CPC ... C08J 5/18; C08J 9/00; C08J 2323/12; C08J 2401/02; B29C 48/0018; B29C 55/16; B29C 48/08; C08K 5/20; C08L 1/02; C08L 23/12

See application file for complete search history.

(56) References Cited

U.S. PATENT DOCUMENTS

| | | | | |
|---|---|---|---|---|
| 2007/0269719 | A1 | 11/2007 | Sadamitsu et al. | |
| 2009/0081543 | A1 | 3/2009 | Takita et al. | |
| 2009/0087749 | A1 | 4/2009 | Takita et al. | |
| 2009/0087750 | A1 | 4/2009 | Takita et al. | |
| 2009/0092893 | A1 | 4/2009 | Takita et al. | |
| 2011/0008638 | A1 | 1/2011 | Miyawaki et al. | |
| 2011/0300430 | A1 | 12/2011 | Usami et al. | |
| 2013/0291729 | A1* | 11/2013 | Baer .................. | B01D 53/228 96/12 |
| 2014/0087167 | A1 | 3/2014 | Yamada et al. | |
| 2014/0227605 | A1 | 8/2014 | Nakamura et al. | |

(Continued)

FOREIGN PATENT DOCUMENTS

| | | |
|---|---|---|
| JP | 49-99777 A | 9/1974 |
| JP | 50-19146 B1 | 7/1975 |
| JP | 4-87759 A | 3/1992 |

(Continued)

OTHER PUBLICATIONS

A. Amash, et al; "Morphology and properties of isotropic and oriented samples of cellulose fibre-polypropylene composites"; Polymer; vol. 41; 2000; pp. 1589-1596; 9 pgs. total.

International Search Report dated May 17, 2016 issued by the International Searching Authority in counterpart International Application PCT/JP2016/055644 (PCT/ISA/210).

Written Opinion dated May 17, 2016 issued by the International Searching Authority in counterpart International Application PCT/JP2016/055644 (PCT/ISA/237).

(Continued)

*Primary Examiner* — Kara B Boyle

(74) *Attorney, Agent, or Firm* — Sughrue Mion, PLLC

(57) ABSTRACT

The present invention provides a method for producing a microporous film, including: preparing a resin composition containing polypropylene (PP) as a resin component and containing from 0.01 to 20 parts by weight of a chemically modified cellulose or chemically modified cellulose nanofiber per 100 parts by weight of the resin component and from 0.01 to 3 parts by weight of a β-crystal nucleating agent per 100 parts by weight of the resin component; melt-molding the resin composition into a film-like material in which the crystal phase of a polypropylene component in the resin composition is substantially a β-crystal phase, and subsequently stretching the film-like material at a temperature of 60 to 160° C., and provides a microporous film.

1 Claim, 2 Drawing Sheets

(56) References Cited

U.S. PATENT DOCUMENTS

2016/0133902 A1 5/2016 Nakamura et al.

FOREIGN PATENT DOCUMENTS

| | | | | |
|---|---|---|---|---|
| JP | 6-80832 | A | | 3/1994 |
| JP | 2883726 | B2 | | 4/1999 |
| JP | 2008-111134 | A | | 5/2008 |
| JP | 2009-263848 | A | | 11/2009 |
| JP | 2010-171005 | A | | 8/2010 |
| JP | 2010171005 | A | * | 8/2010 |
| JP | 2010-540692 | A | | 12/2010 |
| JP | 2011-162773 | A | | 8/2011 |
| JP | 2012-179798 | A | | 9/2012 |
| JP | 5462227 | B2 | | 4/2014 |
| JP | 2014-141644 | A | | 8/2014 |
| JP | 2014-181250 | A | | 9/2014 |
| JP | 2014-224240 | A | | 12/2014 |
| WO | 2014/196551 | A1 | | 7/1918 |
| WO | 2013035786 | A1 | | 3/2013 |

OTHER PUBLICATIONS

Search Report dated Jul. 2, 2018 by the European Patent Office in counterpart European Patent Application No. 16755625.7.

Communication dated Jun. 11, 2019, issued by the Japanese Patent Office in corresponding Japanese Application No. 2015-036911.

* cited by examiner

METHOD FOR MANUFACTURING MICROPOROUS FILM AND MICROPOROUS FILM

TECHNICAL FIELD

The present invention relates to a method for producing a polyolefin-based microporous film containing a cellulose nanofiber (hereinafter referred to as CeNF), and a microporous film.

BACKGROUND ART

Conventionally, for use in precise filtration of gas or liquid or in the application requiring separation, such as separator of a battery, a microporous film having air permeability is often used. As a simple method for producing such a microporous film, a method where polypropylene (hereinafter referred to as PP) is kneaded with an inorganic filler particle such as calcium carbonate, silicon oxide and barium sulfate, film-formed and then stretched to generate micropores was initially known. The microporous film obtained by such a method has a problem that ash remains after burning on disposal or due to low compatibility of an inorganic filler particle with a polyolefin, the inorganic filler particle falls off as dust during production or during use.

Among the above-described applications of the microporous film, in the case of a separator for a lithium ion battery, it is required that even when the battery temperature further rises after shutdown at the time of temperature rise, the battery is safely terminated by maintaining insulation without breakage of the separator (short-circuit) until high temperatures. In order to satisfy these requirements, various methods, such as coating with a heat-resistant layer or formation of a multilayer separator structure, have been attempted. However, the production method is complicated or thinning is difficult. The task of further enhancing the dynamic physical properties and heat resistance has not yet been solved.

In the method for producing such a microporous film, a polyolefin-based resin is used. As the method for producing a microporous film by using this resin, two methods, i.e., a wet process (phase separation method) and a dry process (stretch method), are widely known.

In the wet process, a polyolefin-based resin and a plasticizer such as paraffin are melted/kneaded in an apparatus having kneading ability, such as extruder or desktop kneader, and then extruded into a sheet shape by using a T-die, etc. Phase separation occurs between the plasticizer and the resin when the resin extruded into a sheet shape is cooled on a roll, and the sheet is then biaxially stretched longitudinally and transversely either sequentially or simultaneously to thereby being thinned. Subsequently, the plasticizer in the thin film is extracted and removed using an organic solvent, etc. to obtain a microporous film. However, in this method, a plasticizer extraction step is required and therefore, there is a problem that the production process is complicated and the production line becomes long. In addition, treatment, adverse effect on the human body, etc. of the organic solvent used for extracting the plasticizer becomes a problem (Patent Documents 1 and 2).

On the other hand, as for the dry process, there is a method where a polyolefin-based resin is melted/kneaded in an apparatus having kneading ability, such as extruder or desktop kneader, and then formed into a sheet shape by using a T-die, etc. and the sheet is thinned at a high draft ratio, then subjected to heat treatment to produce a crystal of high regularity in the sheet and thereafter, stretched at low temperature and high temperature to cause crystal interfacial peeling and create an interstitial portion between lamellas, thereby forming a porous structure. In this method, unlike the above-described wet process, an extraction step is not required, and the production process can thereby be simplified, but due to uniaxial stretching, the stretch ratio is low, and the yield of the microporous film obtained is low, leading to a cost rise. In addition, the method has a problem that the strength in the width direction is low and the film is likely to be longitudinally torn when punctured by a sharp projection (Patent Documents 3 and 4).

In order to cope with this problem, a β-crystal method in which a film-like material obtained by kneading and molding a PP composition including a PP substrate in place of an inorganic filler particle and a β-crystal nucleating agent is stretched at a temperature of 120 to 150° C. to provide good air permeability has been developed (Patent Document 5). However, even by this method, heat resistance can only be maintained generally up to approximately from 160 to 170° C., though the melting point of PP varies depending on the molecular weight and stretching conditions.

Patent Document 6 describes the result that when CeNF is compounded into a polyethylene substrate by a wet process, the separator properties are greatly enhanced compared with conventional separators. This result clearly reveals the effect due to compounding of CeNF in a separator, but the substrate is a polyethylene and since the melting point thereof is approximately from 130 to 140° C., though it may vary depending on the molecular weight or stretching conditions, the heat resistance is lower than in the dry process using a PP substrate. In addition, because of use of a degreasing solvent in the wet process, the production process is complicated, leading to a high cost, and there is an environmental problem.

BACKGROUND ART DOCUMENT

Patent Document

Patent Document 1: JP-A-2010-540692
Patent Document 2: JP-A-2014-181250
Patent Document 3: Japanese Patent No. 2883726
Patent Document 4: JP-A-2012-179798
Patent Document 5: JP-A-2011-162773
Patent Document 6: Japanese Patent No. 5462227

SUMMARY OF THE INVENTION

Problems that the Invention is to Solve

The present invention has been made to solve the problems in each of Patent Documents 1 to 6, and an object thereof is in particular to provide a production method of a microporous film being easily producible and excellent in the strength properties/heat resistance and ensuring high productivity, and a microporous film.

Means for Solving the Problems

A method for producing a microporous film according to the present invention is:

[1] A method for producing a microporous film, the method including:

melt-molding a resin composition including a resin component including polypropylene, from 0.01 to 20 parts by weight of a chemically modified cellulose or chemically modified cellulose nanofiber per 100 parts by weight of the resin component, and from 0.01 to 3 parts by weight of a β-crystal nucleating agent per 100 parts by weight of the resin component, into a film-like material in which a crystal phase of a polypropylene component in the resin composition has a β-crystal forming ability of 60% or more; and subsequently stretching the film-like material at a temperature of 60 to 160° C.,

[2] A method for producing a microporous film, the method including:

melt-molding a resin composition including a resin component including polypropylene and a chemically modified cellulose or chemically modified cellulose nanofiber obtained by chemically adding from 0.01 to 3 parts by weight of a β-crystal nucleating agent per 100 parts by weight of the resin component to from 0.01 to 20 parts by weight of a chemically modified cellulose or chemically modified cellulose nanofiber per 100 parts by weight of the resin component, into a film-like material in which a crystal phase of a polypropylene component in the resin composition has a β-crystal forming ability of 60% or more; and subsequently stretching the film-like material at a temperature of 60 to 160° C.,

[3] The method for producing a microporous film according to [1] or [2], in which the resin component including polypropylene is a resin including isotactic polypropylene having a melt flow rate of 1 to 50 g/10 min (230° C.) and a pentad fraction of 80 to 98%, and is a resin including polypropylene having a molecular weight of 100,000 or more and Mw/Mn of 2 to 10,

[4] The method for producing a microporous film according to any one of [1] to [3], in which the β-crystal nucleating agent is any one of:

(1) at least one member selected from the group consisting of N,N'-diphenylhexanediamide, N,N'-dicyclohexylterephthalamide and N,N'-dicyclohexyl-2,6-naphthalenedicarboxamide;

(2) at least one member selected from the group consisting of N,N'-dicyclohexanecarbonyl-p-phenylenediamine, N,N'-dibenzoyl-1,5-diaminonaphthalene, N,N'-dibenzoyl-1,4-diaminocyclohexane and N,N'-dicyclohexanecarbonyl-1,4-diaminocyclohexane;

(3) at least one member selected from the group consisting of N-cyclohexyl-4-(N-cyclohexanecarbonylamino)benzamide and N-phenyl-5-(N-benzoylamino)pentanamide; and (4) a mixture of two or more amide-based compounds in (1) to (3),

[5] The method for producing a microporous film according to any one of [1] to [4], in which a raw material of the chemically modified cellulose or chemically modified cellulose nanofiber is a cellulose nanofiber having a fiber diameter adjusted to be from 5 nm to 1 μm by a fibrillation treatment method such as a high-pressure homogenizer treatment or a counter collision treatment,

[6] The method for producing a microporous film according to any one of [1] to [5], in which the chemically modified cellulose or chemically modified cellulose nanofiber is a chemically modified cellulose or chemically modified cellulose nanofiber prepared by adding from 2 to 10 wt % of a dibasic acid anhydride by kneading and reaction at 80 to 140° C., followed by addition-polymerizing from 1 to 20 wt % of an alkylene oxide under heating at 80 to 140° C. in a pressure-resistant container, and

[7] A method for producing a microporous film, the method including: a step of melting and kneading a polyolefin-based resin, a β-crystal nucleating agent and a chemically modified cellulose or chemically modified cellulose nanofiber or melting and kneading a chemically modified cellulose or chemically modified cellulose nanofiber chemically added with a polyolefin-based resin and a β-crystal nucleating agent, to obtain a polyolefin resin composition; a step of extrusion-molding the polyolefin resin composition into a sheet shape; and a step of processing the obtained sheet-like molding into a film by stretching, thereby performing sequentially or simultaneously the stretching at a temperature not more than a melting point of the polyolefin resin composition and a thermal fixing step for inhibiting contraction.

A microporous film according to the present invention is:

[8] A microporous film produced by the production method according to [7].

A method for producing a microporous film according to the present invention is:

[9] The method for producing a microporous film according to [7], in which the polyolefin-based resin is a resin including isotactic polypropylene having a melt flow rate of 1 to 50 g/10 min (230° C.) and a pentad fraction of 80 to 98% and is a resin including polypropylene having a molecular weight of 100,000 or more and Mw/Mn of 2 to 10, the β-crystal nucleating agent is any one of (1) at least one member selected from the group consisting of N,N'-diphenylhexanediamide, N,N'-dicyclohexylterephthalatnide and N,N'-dicyclohexyl-2,6-naphthalenedicarboxamide;

(2) at least one member selected from the group consisting of N,N-dicyclohexanecarbonyl-p-phenylenediamine, N,N'-dibenzoyl-1,5-diaminonaphthalene, N,N'-dibenzoyl-1,4-diaminocyclohexane and N,N'-dicyclohexanecarbonyl-1,4-diaminocyclohexane;

(3) at least one member selected from the group consisting of N-cyclohexyl-4-(N-cyclohexanecarbonylamino)benzamide and N-phenyl-5-(N-benzoylamino)pentaneamide; and (4) a mixture of two or more amide-based compounds in (1) to (3), a raw material of the chemically modified cellulose or chemically modified cellulose nanofiber is a cellulose nanofiber having a fiber diameter adjusted to be from 5 nm to 1 μm by a fibrillation treatment method such as a high-pressure homogenizer treatment or a counter collision treatment, and a microporous film is continuously produced.

A microporous film according to the present invention is:

[10] A microporous film produced by the production method according to [9], and

[11] The microporous film according to [8], having a Gurley value of from 10 to 2,000 sec/100 cc and a porosity of from 25 to 80%.

A method for producing a microporous film according to the present invention is:

[12] The method for producing a microporous film according to any one of [1] to [7] and [9], in which the stretching is biaxial stretching.

A microporous film according to the present invention is:

[13] The microporous film according to any one of [8], [10] and [11], in which the stretching is biaxial stretching.

Advantage of the Invention

The microporous film production method and the microporous film according to the present invention are configured as above, and a microporous film having a high porosity and excellent air permeability is therefore obtained in a simple and easy manner by using PP having higher versatility without containing inorganic material.

Accordingly, a microporous film obtained by the present invention is best suited for precise filtration of gas or liquid or in the application requiring separation, such as separator of a battery. In addition, the microporous film is suitably used, e.g., for various packaging materials for a dehumidifying agent, a deoxidizer, a chemical warmer, etc., for clothing materials such as simple rainwear, simple work clothes and gloves, for building sheets such as tarpaulin and wind-resistant sheet, and for agricultural mulch sheets.

MODE FOR CARRYING OUT THE INVENTION

According to the microporous film production method and the microporous film of the present invention, a chemically modified CeNF-reinforced microporous film having a high porosity, excellent air permeability, improved mechanical properties, and increased heat resistance is obtained.

Preferred embodiments of the microporous film production method and the microporous film of the present invention are described below with reference to the drawings.

Figure 1:
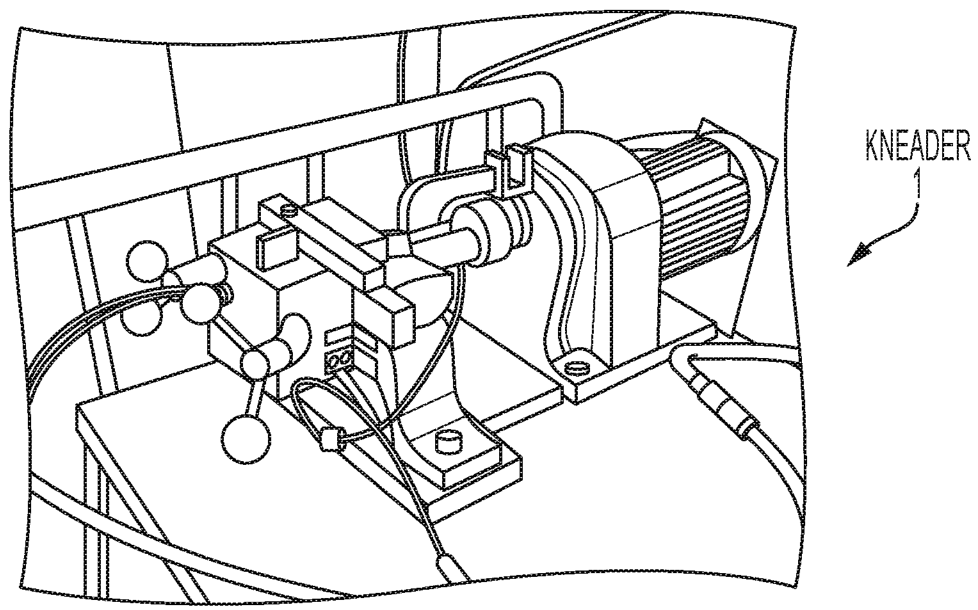
FIG. 1 is an external view of the small kneader used for producing the microporous film of the present invention containing a polyolefin-based resin, a β-crystal nucleating agent and CeNF.
Figure 2:
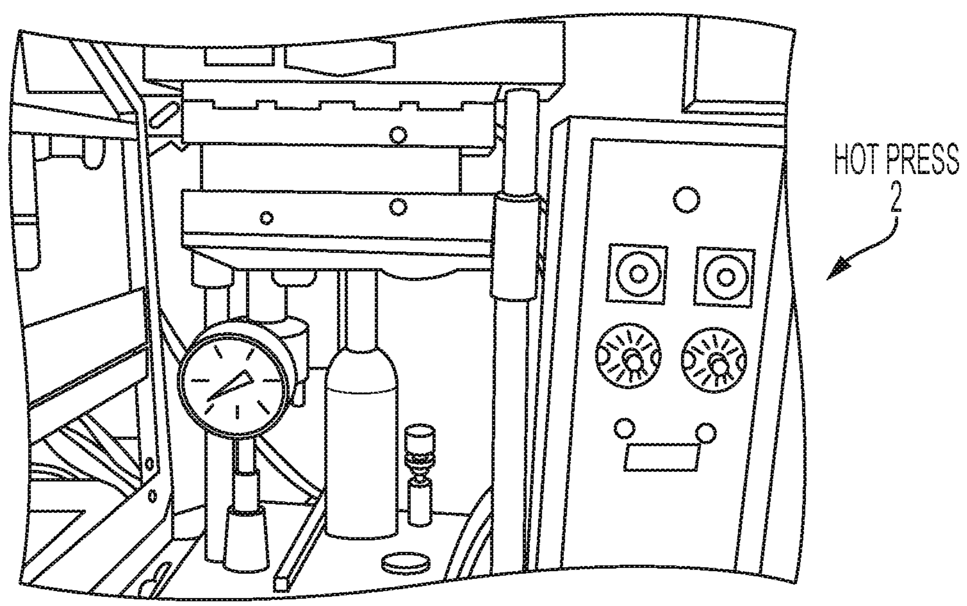
FIG. 2 is an external view of a hot press as the molding apparatus used for sheet molding in the present invention.
Figure 3:
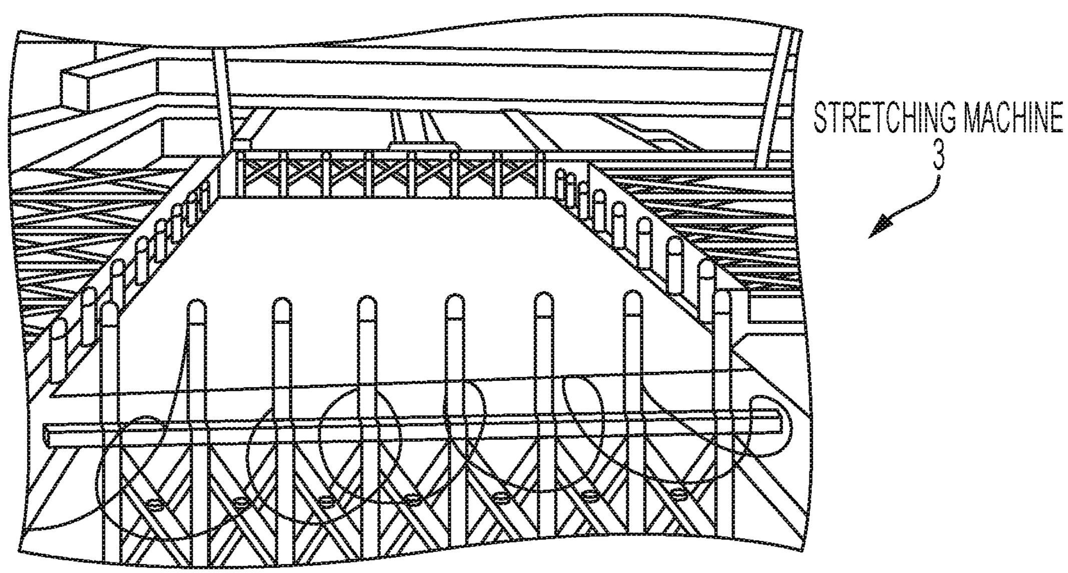
FIG. 3 is an external view showing the stretching apparatus used for film stretching in the present invention.

In implementing the present invention, a kneader 1 of FIG. 1, a control part of FIG. 2, and a stretcher 3 of FIG. 3 were used.

First, taking into account the above-described problems, the present inventors have continued intensive studies.

As a result, it has been found that the object above can be attained by a method where a film-like material obtained by kneading a chemically modified cellulose as a polybasic acid anhydride/alkylene oxide sequential adduct of cellulose, or a chemically modified cellulose nanofiber together with a β-crystal nucleating agent and PP and molding the mixture is stretched at a specific stretch temperature. The present invention has been accomplished based on this finding.

More specifically, the conditions enabling the formation of a β-crystal having 60% or more of a crystal phase of PP component by co-kneading with a β-crystal nucleating agent, despite containing the above-described chemically modified cellulose or chemically modified cellulose nanofiber, have been discovered, and it has been found that a PP microporous film is thereby obtained as a single-layered thin film and at the same time, is excellent in the mechanical properties and heat resistance.

That is, the present invention provides a microporous film and a production method therefor, characterized in that a resin composition containing a resin component including PP, from 0.01 to 20 parts by weight of a chemically modified cellulose or chemically modified cellulose nanofiber per 100 parts by weight of the resin component, and from 0.01 to 3 parts by weight of a 0-crystal nucleating agent per 100 parts by weight of the resin component is melt-molded into a film-like material in which the crystal phase of PP component in the resin composition has a β-crystal forming ability of 60% or more, and the film-like material is then stretched at a temperature of 60 to 160° C.

In addition, the present invention provides a microporous film and a production method therefor, characterized in that a resin composition containing a resin component including PP and a chemically modified cellulose or chemically modified cellulose nanofiber obtained by chemically adding from 0.01 to 3 parts by weight of a β-crystal nucleating agent per 100 parts by weight of the resin component to from 0.01 to 20 parts by weight of a chemically modified cellulose or chemically modified cellulose nanofiber per 100 parts by weight of the resin component is melt-molded into a film-like material in which the crystal phase of PP component in the resin composition has a β-crystal forming ability of 60% or more, and the film-like material is then stretched at a temperature of 60 to 160° C.

In the present invention, PP includes, for example, a propylene homopolymer and a copolymer of an α-olefin having a carbon number of 2 to 10, such as ethylene, butene, pentene and hexane. Here, the amount of an α-olefin copolymerized in the propylene/α-olefin copolymer is not particularly limited but is preferably 10 wt % or less. The melt flow index (230° C.) of the resin component including PP is preferably from 0.1 to 50 g/10 min, more preferably from 1 to 50 g/10 min. In addition, PP is preferably an isotactic polypropylene having a pentad fraction of 80 to 98%. Furthermore, PP preferably has a molecular weight of 100,000 or more and Mw/Mn of 2 to 10.

The chemically modified cellulose for use in the present invention may or may not undergo nanofibrillation at the time of chemical modification. The cellulose raw material is prepared by using, as a raw material, cellulose powder such as microcrystalline cellulose (CEOLUS: microcrystalline cellulose product, produced by Asahi Kasei Chemicals Corp.) or cellulose nanofiber, adding thereto a dibasic acid anhydride in an amount of 2 to 10 wt % through a kneading reaction using a pressure kneader, etc. under the catalyst-free condition while heating at 80 to 140° C. that is the conditional temperature for monoestrification, followed by addition-polymerizing from 1 to 20 wt % of an alkylene oxide in the absence of a catalyst under heating at 80 to 140° C. in a pressure-resistant vessel. As described above, the raw material may or may not undergo nanofibrillation at the time of chemical modification but is preferably a cellulose nanofiber having a fiber diameter adjusted to be from 5 nm to 1 μm by a fibrillation treatment method such as a high-pressure homogenizer treatment and a counter collision treatment. This cellulose chemical modification method is characterized by not requiring solvent cleaning at all and in turn, being a very low-cost and green chemical process. As to the chemical modification method, there are other ways of thinking and approaches, but in the present invention, the method is fixed to the above-described approach.

In the present invention, the blending ratio of the chemically modified cellulose or chemically modified cellulose nanofiber is from 0.01 to 20 parts by weight, suitably from 0.01 to 10 parts by weight, per 100 parts by weight of the PP resin component.

In the present invention, a β-crystal nucleating agent is used together with the above-described resin component. As the β-crystal nucleating agent, known compounds can be used without any particular limitation, but preferred examples thereof include a pigment such as quinacridone, quinacridonequinone, isoindoquinone, phthalocyanine, Indigosol Brown IRRD, Indigosol Red Violet IRH, Cibatin Orange HR, Indigosol Pink IR, Cibatin Blue 2B, Indigosol Golden Yellow IGK and Indigosol Gray IBL; alkali or alkaline earth metal salts of carboxylic acid, such as sodium benzoate, magnesium succinate, magnesium phthalate, magnesium terephthalate, magnesium isophthalate and sodium 1,2-hydroxystearate; an aromatic sulfonic acid-based compound such as sodium benzenesulfonate and sodium naphthalinesulfonate; and an aromatic amide compound such as N,N'-diphenylhexanediamide, N,N'-dicyclohexylterephthalamide, N,N'-dicyclohexyl-2,6 naphthalcncdicarboxylamido naphthalenedicarboxamide, N,N'-dicyclohexanecarbonyl-p-phenylenediamine, N,N'-dibenzoyl-1,5-diaminonaphthalene, N,N'-dibenzoyl-1,4-diaminocyclohexane, N,N'-dicyclohexanecarbonyl-1,4-diaminocyclohexane, N-cyclohexyl-4-(N-cyclohexanecarbonylamino)benzamide and N-phenyl-5-(N-benzoylamino)pentanamide.

In the present invention, the blending ratio of the β-crystal nucleating agent is from 0.01 to 3 parts by weight, suitably from 0.05 to 2 parts by weight, per 100 parts by weight of the PP resin component. If the blending ratio of the β-crystal nucleating agent is less than 0.01 parts by weight, the β-crystal can hardly grow. On the other hand, if the blending ratio thereof exceeds 3 parts by weight, poor dispersion of the β-crystal nucleating agent in the resin is caused.

In the resin composition above, additives such as phenol- or sulfur-based antioxidant, dehydrochlorinating agent, lubricant, coloring agent, surfactant, antistatic agent and flame-retarding or preventing agent are preferably blended, if desired. The blending amount thereof is suitably from 0.01 to 2 parts by weight per 100 parts by weight of the resin composition.

In the present invention, it is important to melt-mold the resin composition above into a film-like material in which the crystal phase of PP component is substantially a β-crystal phase. As the melt-molding method, any method may be used. First, blending of respective components is preferably performed by means of a Henschel mixer, a tumbler blender, a V-blender, a ribbon mixer, etc. A mixing temperature of usually from room temperature to 100° C., a rotational speed of the apparatus of usually from 500 to 2,000 rpm, and a mixing time of usually from 1 to 20 minutes are adopted. The resin composition obtained in this way is granulated with an extruder and deposited as a film, for example, by an extrusion molding machine with a T-die or an inflation film molding machine. The resin temperature at the time of granulation or deposition is usually adopted from the range of 180 to 260° C. As for the thickness of the film-like material, a thickness of 10 μm to 50 μm is usually adopted.

The film-like material obtained by the method above usually assumes a state where a β-crystal is not sufficiently grown in the crystal structure of the PP component, and therefore, in the present invention, the film-like material is generally subjected to a treatment for growing a β-crystal. This treatment may be conducted by any method, but in view of the film production step, the crystal is preferably grown by bringing a film-like material coming from the extruder in a molten state into contact with a roll at a specific temperature of not more than the melting point of the β-crystal. The temperature is suitably from room temperature to 160° C., more suitably from 60 to 160° C., still more suitably from 60 to 155° C., yet still more suitably from 60 to 135° C.

In the present invention, it is important that the crystal phase of PP component in the film-like material is substantially constituted of a β-crystal phase. Micropores are thereby successfully generated when the film-like material is stretched, and a microporous film having a high porosity and good air permeability can be produced. Here, in producing the microporous film of the present invention, as long as the crystal phase of PP component is mainly dominated by a β-crystal, an α-crystal may be somewhat contained. The following β-crystal forming ability as measured by a differential scanning calorimeter (DSC):

$$\beta\text{-Crystal forming ability}=\Delta Hb/[(\Delta Ha+\Delta Hb)]\times 100$$

(in which ΔHb is β-crystal melting appearing at 145 to 157° C., ΔHa of 158° C. or more is the melting peak of α-crystal) is 60% or more, preferably 70% or more, further preferably from 80 to 98%.

The β-crystal formation is tracked also by X-ray diffraction (XRD). PP usually forms a spherulite structure (α-type spherulite) constituted of a crystal called α-type (α-crystal), but in the polypropylene raw sheet for capacitors, as described above, a spherulite structure (β-type spherulite) constituted of a crystal called β-type (β-crystal) different from α-type is formed by using a nucleating agent. The unit crystal lattice differs between α- and β-crystals, and since a diffraction peak ((300) plane) specific to β-crystal is observed, the abundance ratio, etc. of β-crystal can be evaluated from an X-ray diffraction pattern. The β-crystal formation mechanism still leaves scientifically unsolved points, but it is known that the size, abundance ratio or distribution of β-type spherulite is changed, for example, by the molding condition of raw sheet or the addition of β-crystal nucleating agent.

Subsequently, in the present invention, the film-like material is preferably subjected to uniaxial or biaxial, sequential or simultaneous stretching by means of a roll stretching machine, a tenter stretching machine, etc.

In the case of forming micropores by a sequential stretching system, as to the longitudinal stretching temperature, an optimal temperature condition may be selected by taking into account the stability of film formation, the control of thickness unevenness, and the objective pore size, permeability, etc. The longitudinal stretching temperature is suitably from 60 to 160° C., more suitably from 80 to 140° C. The effective stretch ratio in the longitudinal direction is preferably from 4 to 10 times. If the effective stretch ratio in the longitudinal direction is less than 4 times, the obtained microporous film may have poor permeability. In addition, due to the low stretch ratio, the film forming speed is low even with the same casting speed, and the productivity may be poor. If the effective stretch ratio in the longitudinal direction is more than 10 times or more, film breaking may occur in the longitudinal stretching or transverse stretching step, causing deterioration of the film productivity.

In the cooling process after longitudinal stretching, a relaxation step may be provided to an extent not affecting the shape or dimension of film, the pore size, the permeability, etc. This step is preferred from the viewpoint of dimensional stability in the longitudinal stretching direction. The strain rate in the longitudinal stretching is preferably from 5 to 50,000 $sec^{-1}$ in view of productivity and stability of film formation.

The film after longitudinal stretching is, via a preheating step, subjected to transverse stretching in the transverse direction. The temperature in the preheating step may be appropriately selected according to the film raw material but is preferably a temperature from 1 to 20° C. lower than the transverse stretching temperature ($M_{TD}$). As to the transverse stretching temperature, an optimal temperature condition may be selected by taking into account the stability of film formation, the control of thickness unevenness, and the objective pore size, permeability, etc. The transverse stretching temperature is suitably from 60 to 160° C., more suitably from 100 to 150° C. The transverse stretching rate is preferably from 5 to 50,000 $sec^{-1}$ in view of productivity or dimensional stability.

The effective stretch ratio of the transversely stretched film is preferably 10 times or less. If the transverse stretch ratio is more than 10 times or more, a rupture occurs in the film and affects the productivity or film formability. The transverse stretch ratio is preferably from 3 to 10 times.

The longitudinal stretch and transverse stretch ratios may be from 1.1 to 100 times in terms of the area magnification ratio to the raw sheet, but excessive stretching may break the film and therefore, the stretch ratio is suitably from 1.1 to 60 times.

In the case of forming a microporous film by simultaneous biaxial stretching, the stretch ratio is preferably from 4 to 10 times in the longitudinal direction and from 3 to 10 times in the transverse dictions and is optimally from 1.1 to 60 times in terms of the area magnification ratio.

The stretching temperature in the simultaneous biaxial stretching is suitably from 60 to 160° C., more suitably from 100 to 158° C. When the stretching temperature is 100° C. or more, stretching can be performed efficiently, and when it is 158° C. or less, the temperature is lower than the melting point of the film raw material, advantageously lessening the risk of melting.

The stretching rate in the simultaneous biaxial stretching is preferably from 5 to 50,000 $sec^{-1}$. Because, if the stretching rate deviates from the range above, the stability of film formation or the dimensional stability is deteriorated to affect the permeability of the film.

The stretching temperature in the sequential stretching is suitably from 60 to 160° C., more suitably from 100 to 158° C., still more suitably from 120 to 155° C. If the stretching temperature exceeds the suitable temperature, a β-crystal is immediately changed to an α-crystal due to heat during stretching, and micropores are not successfully generated in the film. When the stretching temperature is 100° C. or more, efficient stretching is advantageously performed, and micropores are thereby successfully generated in the obtained microporous film. When such stretching is applied, the crystal structure of PP component in the film usually undergoes crystal transition from the β-crystal phase to an α-crystal phase.

In the present invention, the microporous film is not limited only to a single-layer film but may also be a film having a multilayer structure in which a film having a different formulation in the resin composition of the present invention or another microporous film is stacked, or a film of which surface is coated with a resin, a metal, a ceramic, etc. having higher heat resistance than that of the base material.

In the microporous film of the present invention, the Gurley value is preferably from 10 to 2,000 sec/100 cc, and the porosity is preferably from 25 to 80%.

EXAMPLES

In the following, Examples are demonstrated below in order to describe the present invention more specifically, but the present invention is not limited to these Examples by any means.

Physical properties of each of the microporous films of Examples and Comparative Examples were measured by the following methods.

(1) The β-crystal forming ability was measured using a differential scanning calorimeter (DSC). The apparatus used was Model RINT-TTRIII (manufactured by PerkinElmer Co., Ltd.).

(2) Another conformation of the β-crystal forming ability was performed by X-ray diffraction (XRD). The apparatus was procured from PANalytical (manufactured by Spectrios Spectris PLC)

(3) Mechanical properties were measured using Autograph (manufactured by Shimadzu Corporation).

(4) As for the puncture strength, the maximum load when a needle penetrated was measured using an automatic puncture strength meter (KES-FB3-AUTO, manufactured by Kato Tech Co., Ltd.). Measurement was performed at 10 points of the same film, and the average value thereof was calculated.

(5) The Gurley value was measured using a Gurley automatic measuring machine (manufactured by TESTING MACHINES, INC.) after cutting the prepared film into a 50×50 mm square. In this measurement, the time spent until 100 cc of air passed through the film, stipulated in JIS P8177, was taken as the Gurley value.

(6) As for the porosity and film thickness, the sample was cut into a 50×50 mm square and by measuring the film at 10 points of each part by means of a micrometer, the average value thereof was taken as the film thickness. The porosity was calculated from the measured film weight and the theoretical weight calculated based on the density and the volume.

PP, β-crystal nucleating agent, and chemically modified cellulose used in the present invention are as follows.

1) PP

A homopolymer having a density of 0.920 g/$cm^3$ and MFI of 8.0 g/10 min, Nobrene (produced by Sumitomo Chemical Co., Ltd.)

2) β-Crystal Nucleating Agent (A) MPM113 (Mayzo, Inc.) (masterbatch for PP resin)

(B) Amides-based β-crystal nucleating agent (C) Quinacridone (PV-19γ type, Dainichiseika Color & Chemicals Mfg. Co., Ltd.)

(D) Calcium pimelate

3) Chemically Modified Cellulose

The chemically modified cellulose was prepared by using, as a raw material, cellulose powder such as Avicel (CEOLUS: microcrystalline cellulose product, produced by Asahi Kasei Chemicals Corp.), adding thereto a dibasic acid anhydride in an amount of 2 to 10 wt % through a kneading reaction using a pressure kneader, etc. under the catalyst-free condition while heating at 80 to 140° C. that is the conditional temperature for monoestrification, followed by addition-polymerizing from 1 to 20 wt % of an alkylene oxide in the absence of a catalyst under heating at 80 to 140° C. by using a pressure-resistant vessel.

Example 1

A resin composition containing a PP resin component, 1 part by weight of the chemically modified cellulose per 100 parts by weight of the resin component, and 0.3 parts by weight of the β-crystal nucleating agent (A) per 100 parts by weight of the resin component was kneaded for 10 minutes at 200° C. and 80 rpm by using a desktop kneader (manufactured by The Japan Steel Works, Ltd.) as the kneader 1 illustrated in FIG. 1 and then subjected to heat-pressing molding for 5 minutes at 200° C. by using the hot press 2 illustrated in FIG. 2 to obtain a sheet having a thickness of 1 mm. Sequential stretching of the sheet was performed using the stretching machine 3 illustrated in FIG. 3.

Example 2

In the method of Example 1, the PP resin and the β-crystal nucleating agent (B) were used as raw materials. Other conditions were the same as in Example 1.

Comparative Example 1

In the method of Example 1, the PP resin and the β-crystal nucleating agent (C) were used as raw materials. Other conditions were the same as in Example 1.

Comparative Example 2

In the method of Example 1, the PP resin and the β-crystal nucleating agent (D) were used as raw materials. Other conditions were the same as in Example 1.

Comparative Example 3

The blending amount of the chemically modified cellulose was changed to 0, and the β-crystal nucleating agent (A) was used. Other conditions were the same as in Example 1.

Comparative Example 4

Characteristic values of Example 1 described in JP-A-2014-224240.

Comparative Example 5

Selion P1610 (dry process PP separator produced by CS TECH CO., LTD: lamellar pore-forming method)

Comparative Example 7

CeNF-compounded separator manufactured by wet process (Japanese Patent No. 5462227).

Comparison of Results

The β-crystal forming ability of each of the sheets prepared under the conditions of Examples 1 and 2 and Comparative Examples 1 to 3 is shown in Table 1. The β-crystal forming ability was 80% or more in both of Examples 1 and 2. On the other hand, in Comparative Example 3 where cellulose was not added, the β-crystal forming ability was 80% as well, and it is judged that addition of cellulose does not contribute to the β-crystal formation.

TABLE 1

β-Crystal Forming Ability and Measurement Results of Physical Properties in Examples and Comparative Examples

| | Production Mode | Species of β Nucleating Agent | CeNF | Stretched State | β-Crystal Forming Ability [%] | Puncture Strength* [gf] | Tensile Strength (MD) [MPa] | Tensile Strength (TD) [MPa] | Heat Resistance** [° C.] |
|---|---|---|---|---|---|---|---|---|---|
| Example 1 | β crystallization | A | added | A | 82 | 500≥ | 200≥ | 200≥ | 160≥ |
| Example 2 | β crystallization | B | added | A | 84 | 500≥ | 200≥ | 200≥ | 160≥ |
| Comparative Example 1 | β crystallization | C | added | B | 0 | — | — | — | — |
| Comparative Example 2 | β crystallization | D | added | B | 0 | — | — | — | — |
| Comparative Example 3 | β crystallization | A | none | A | 80 | 450≤ | 150≥ | 150≥ | 140≥ |
| Comparative Example 4 | β crystallization | — | none | A | 86 | 450≤ | 120≥ | 120≥ | 135≤ |
| Comparative Example 5 | lamellar pore-forming | — | none | A | — | 450≤ | 100≥ | 50≥ | 130≥ |
| Comparative Example 6 | wet process | — | none | A | — | 450≤ | 120≥ | 120≥ | 120≥ |
| Comparative Example 7 | wet process | — | added | A | — | 500≥ | 200≥ | 200≥ | 140≥ |

*In terms of thickness of 25 μm

**Temperature giving 5% or more shrinkage in MD

Next, in the case of using the nucleating agents of Comparative Examples 1 and 2, the β-crystal forming ability was 0%. Since these β-crystal nucleating agents are described in another patent (JP-A-4-087759), it is presumed that the β-crystal forming ability is expressed only when the molding conditions are satisfied.

Each of the sheets obtained in Examples and Comparative Examples was processed into a film by performing sequential stretching. Respective physical values of the film are shown together in Table 1. In both of Examples 1 and 2, the stretched state was good. On the other hand, the sheets of Comparative Examples 1 and 2 where the β-crystal forming ability was not confirmed could not be stretched.

In Examples 1 and 2 where cellulose was added, the puncture strength was 500 gf/cm$^2$ or more and was increased by at least 10% or more, compared with Comparative Examples 3 and 4 where cellulose was not added. The puncture strength indicates the strength when the film is broken, for example, by lithium ion dendrites generated due to temporal deterioration or by mixing of foreign matters at the time of manufacture of a battery. The improvement of puncture strength in Examples 1 and 2 is presumed to an effect coming from high-level dispersion of the added cellulose nanofiber in the sheet to compound with the resin.

As for the tensile strength, the improvement of the strength was confirmed when cellulose was added, i.e., in Examples 1 and 2. This is presumed to be an effect coming from compounding of cellulose with resin.

Comparative Example 1 is a sheet using the β-crystal nucleating agent (C), and the sheet could not be stretched.

Comparative Example 2 is a sheet using the β-crystal nucleating agent (D), and the sheet could not be stretched.

Comparative Example 3 is the separator of Example 1 described in JP-A-2011-162773.

Comparative Example 5 shows the physical values of a commercially available separator film produced by a lamellar pore-forming method (dry process).

Comparative Example 6 shows the physical values of a separator produced using a polyethylene base material by a wet process.

Comparative Example 7 shows the physical values of a cellulose nanofiber composite separator produced by the method described in Japanese Patent No. 5462227. It is seen that the puncture strength was greatly enhanced due to compounding, compared with Comparative Example 6, and the heat resistance was increased by about 20° C. However, since the base material is polyethylene, the contraction was increased at about 140° C. under the relevant production condition. Even so, the heat resistance was increased, compared with the commercially available separator film of Comparative Example 5 produced by a lamellar pore-forming method.

Figure 4:
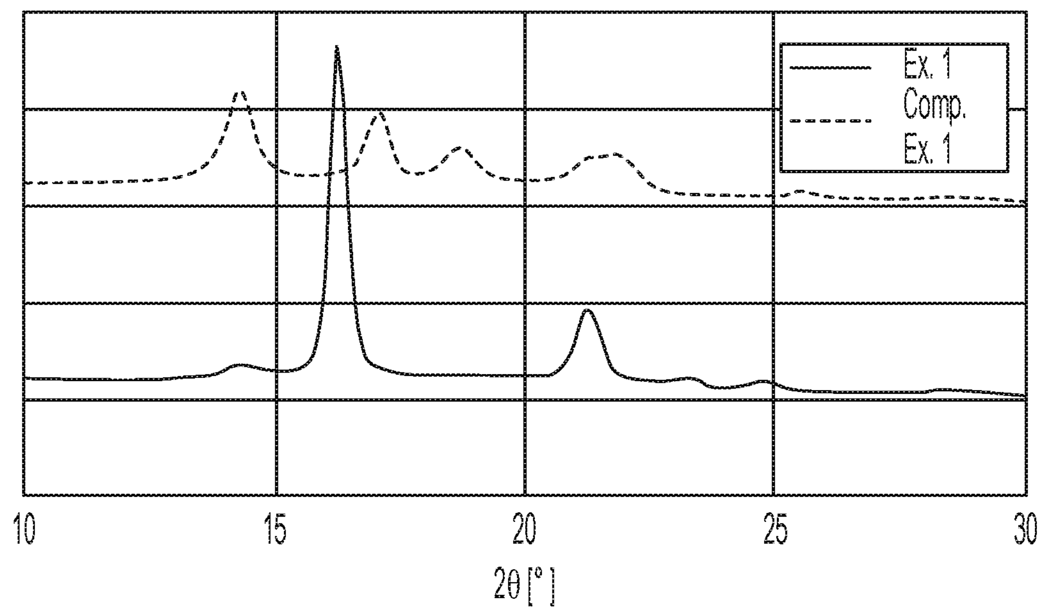
FIG. 4 is XRD analysis results.

FIG. 4 illustrates the analysis results of XRD using the sheets of Example 1 and Comparative Example 1. The film can be judged to have β-crystal activity when a diffraction peak derived from the (300) plane of β-crystal of the polypropylene-based resin is detected in the range of $2\theta$=16.0°-16.5°. In Comparative Example 1 having no β-crystal forming ability, a peak of β-crystal is not observed. On the other hand, in Example 1 having β-crystal forming ability, a peak of β-crystal is detected in the above-described range, and it is revealed that in the sheet of the present invention, a β-crystal necessary for the formation of micropores is formed.

While the invention has been described in detail and with reference to specific embodiments thereof, it will be apparent to one skilled in the art that various changes and modifications can be made therein without departing from the spirit and scope of the invention.

This application is based on Japanese Patent Application (Patent Application No. 2015-036911) filed on Feb. 26, 2015, the contents of which are incorporated herein by way of reference.

INDUSTRIAL APPLICABILITY

The separator obtained using the microporous film of the present invention containing a polyolefin-based resin, a β-crystal nucleating agent, and a chemically modified cellulose or chemically modified cellulose nanofiber and using the production method thereof, can provide a high-quality cellulose nanofiber-compounded separator in which a chemically modified cellulose or chemically modified cellulose nanofiber prepared by adding from 2 to 10 wt % of a dibasic acid anhydride through a kneading reaction at 80 to 140° C., followed by addition-polymerizing from 1 to 20 wt % of an alkylene oxide under heating at 80 to 140° C. in a pressure-resistant vessel is compounded with a β-crystal nucleating agent and a polyolefin, and out of mechanical and thermal properties required for the separator for a lithium ion battery (nonaqueous secondary battery), the puncture strength and heat resistance are thereby improved.

DESCRIPTION OF REFERENCE NUMERALS AND SIGNS

1 Kneader
2 Hot press
3 Stretching machine

The invention claimed is:

1. A method for producing a microporous film, the method comprising: a step of melting and kneading a polyolefin-based resin, a β-crystal nucleating agent and a chemically modified cellulose or chemically modified cellulose nanofiber or melting and kneading a chemically modified cellulose or chemically modified cellulose nanofiber chemically added with a polyolefin-based resin and a β-crystal nucleating agent, to obtain a polyolefin resin composition; a step of extrusion-molding the polyolefin resin composition into a sheet-shape molding; and a step of processing the obtained sheet-shape molding into a film by stretching, thereby performing sequentially or simultaneously the stretching at a temperature not more than a melting point of the polyolefin resin composition and a thermal fixing step for inhibiting contraction, wherein the polyolefin-based resin is a resin comprising isotactic polypropylene having a melt flow rate of 1 to 50 g/10 min (230° C.) and a pentad fraction of 80 to 98% and is a resin comprising polypropylene having a molecular weight of 100,000 or more and Mw/Mn of 2 to 10, the β-crystal nucleating agent is any one of:

(1) at least one member selected from the group consisting of N,N'-diphenylhexanediamide, N,N'-dicyclohexylterephthalamide and N,N'-dicyclohexyl-2,6-naphthalenedicarboxamide;

(2) at least one member selected from the group consisting of N,N'-dicyclohexanecarbonyl-p-phenylenediamine, N,N'-dibenzoyl-1,5-diaminonaphthalene, N,N'-dibenzoyl-1,4-diaminocyclohexane and N,N'-dicyclohexanecarbonyl-1,4-diaminocyclohexane;

(3) at least one member selected from the group consisting of N-cyclohexyl-4-(N-cyclohexanecarbonylamino) benzamide and N-phenyl-5-(N-benzoylamino)pentaneamide; and (4) a mixture of two or more amide-based compounds in (1) to (3), the chemically modified cellulose or chemically modified cellulose nanofiber is a chemically modified cellulose or chemically modified cellulose nanofiber prepared by adding from 2 to 10 wt % of a dibasic acid anhydride by kneading and reaction at 80 to 140° C., followed by addition-polymerizing from 1 to 20 wt % of an alkylene oxide under heating at 80 to 140° C. in a pressure-resistant container, and a microporous film is continuously produced.

* * * * *